United States Patent
Matsuda et al.

(10) Patent No.: US 8,418,791 B2
(45) Date of Patent: Apr. 16, 2013

(54) AIR-INTAKE STRUCTURE OF AN ENGINE

(75) Inventors: Yoshiharu Matsuda, Akashi (JP); Yuto Ogawa, Akashi (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 239 days.

(21) Appl. No.: 12/980,285

(22) Filed: Dec. 28, 2010

(65) Prior Publication Data

US 2011/0155492 A1    Jun. 30, 2011

(30) Foreign Application Priority Data

Dec. 29, 2009    (JP) ................................. 2009-299245

(51) Int. Cl.
*B60K 13/02* (2006.01)

(52) U.S. Cl.
USPC ....................................................... 180/68.3

(58) Field of Classification Search ........ 180/68.1–68.6, 180/219
See application file for complete search history.

(56) References Cited

U.S. PATENT DOCUMENTS 6,564,764 B2 *    5/2003    Karbstein et al. .......... 123/90.48

FOREIGN PATENT DOCUMENTS

JP    2007-064061 A    3/2007

* cited by examiner

*Primary Examiner* — John Walters
*Assistant Examiner* — James Triggs
(74) *Attorney, Agent, or Firm* — Alleman Hall McCoy Russell & Tuttle LLP

(57) ABSTRACT

A vehicle includes a duct structure configured to take in air from outside; an air cleaner including an air filter configured to clean the air guided to the air cleaner through the duct structure; a throttle device including a throttle valve for controlling a flow rate of the air guided to the throttle device through the air cleaner; and an engine including an intake port configured to suction the air guided to the engine through the throttle device; the duct structure including: a main inlet configured to take in air therethrough from outside by utilizing a ram pressure; a main passage extending from the main inlet to the air filter; a sub-inlet configured to take in air therethrough from outside; and a joint section located upstream of the air filter, the air flowing from the sub-inlet being joined to the air in the main passage, at the joint section.

13 Claims, 9 Drawing Sheets

AIR-INTAKE STRUCTURE OF AN ENGINE

CROSS-REFERENCE TO RELATED APPLICATION

The present application claims priority to Japanese Patent Application No. 2009-299245 filed on Dec. 29, 2009 which is hereby incorporated by reference in its entirety for all purposes.

BACKGROUND ART

1. Field of the Invention

The present invention relates to a vehicle including a duct configured to take in air from outside by utilizing a ram pressure.

2. Description of the Related Art

An engine mounted in a vehicle such as a motorcycle includes a cylinder head having a combustion chamber. An air-intake passage is coupled to an intake port of the combustion chamber to guide air and fuel to the combustion chamber. Typically, the air-intake passage includes an air cleaner box of an air cleaner, an air-intake duct, and a throttle body of a throttle device which are coupled to each other in this order from upstream side in an air flow direction. Inside the throttle body, a throttle valve for controlling an air-intake amount and an injector for injecting a fuel are provided.

Japanese Laid-Open Patent Application Publication No. 2007-64061 discloses that in a ram-air air-intake passage configured to take in air from outside efficiently by utilizing the ram pressure, a duct is disposed to extend from an air inlet of an air cleaner box to a front end portion of a vehicle, and an air inlet at a tip end of the duct is oriented to open forward to easily receive the ram pressure.

In a vehicle including such a ram-air air-intake passage, during high-speed driving, air can be taken into the engine (combustion chamber) from outside efficiently by utilizing the ram pressure. However, since a portion of the duct which is located upstream of the air cleaner box in an air flow direction is long and a passage resistance of the air-intake passage is high, it is sometimes difficult to ensure a sufficient air-intake amount required for the engine during low-speed driving when the ram pressure is low. For example, when the vehicle is exiting a corner and is going to drive straight ahead, it is necessary to increase the amount of air supplied to the engine by opening a throttle valve to accelerate the vehicle. However, since the vehicle is exiting a corner at a low speed, the ram pressure is low and the passage resistance is significantly high, it is difficult to obtain a sufficient air-intake amount required for the engine quickly, even when the throttle valve is opened.

SUMMARY OF THE INVENTION

The present invention addresses the above described conditions, and an object of the present invention is to provide a vehicle which is capable of obtaining a sufficient air-intake amount required for an engine quickly during low-speed driving when a ram pressure is low.

According to the present invention, a vehicle comprises a duct structure configured to take in air from outside; an air cleaner including an air filter configured to clean the air guided to the air cleaner through the duct structure; a throttle device including a throttle valve for controlling a flow rate of the air guided to the throttle device through the air cleaner; and an engine including an intake port configured to suction the air guided to the engine through the throttle device; the duct structure including: a main inlet configured to take in air therethrough from outside by utilizing a ram pressure; a main passage extending from the main inlet to the air filter; a sub-inlet configured to take in air therethrough from outside; and a joint section located upstream of the air filter, the air flowing from the sub-inlet being joined to the air in the main passage, at the joint section.

In accordance with this configuration, since the air can be taken in through both the main inlet and the sub-inlet, a passage resistance in the air-intake passage can be reduced. Therefore, even when a ram pressure is low during low-speed driving of the vehicle, it is possible to ensure a sufficient air-intake amount required for the engine quickly. For example, when the vehicle is accelerated as the vehicle is exiting a corner and is going to drive straight ahead, a high acceleration capability is obtained.

The duct structure main includes a main duct component coupled to the air cleaner and constituting at least a portion of a main passage; and a sub-duct component provided at the main duct component or the air cleaner and constituting a sub-passage extending from the sub-inlet to the joint section.

In a specific structure of the duct structure, the sub-duct component may be provided in either the main duct component or the air cleaner. When the sub-duct component is provided in the air cleaner, a portion of the main passage (duct structure) is formed by the air cleaner.

A passage extending from the sub-inlet to the air filter through the joint section may have a length smaller than a length of the main passage.

In accordance with this configuration, since the sub-passage (passage through which air taken in through the sub-inlet flows) extending from the sub-inlet to the air filter through the joint section has a shorter passage length than the main passage (passage through which the air taken in through the main inlet flows), it is possible to reduce a passage resistance in the air-intake passage and ensure a more sufficient air amount required for the engine more quickly than a case where the passage length of the sub-passage is equal to or longer than the passage length of the main passage.

The vehicle may further comprise an on-off valve configured to permit and inhibit air communication between the sub-inlet and the joint section.

In accordance with this configuration, the on-off valve can inhibit undesired air communication between the sub-inlet and the joint section.

The on-off valve may include a valve body positioned to permit and inhibit air flow through the sub-duct component; and the valve body may be configured to open by an air pressure directly applied to the valve body during running of the engine.

In accordance with this configuration, since a driving mechanism and a driving source for opening and closing the valve body are unnecessary, the number of components and members can be reduced.

The on-off valve may be a one-way valve configured to permit only air flowing from the sub-inlet toward the joint section.

In accordance with this configuration, it is possible to prevent the air taken into the main passage through the main inlet from flowing back and releasing to outside through the sub-inlet, and therefore, it is possible to prevent an inner pressure in a portion of the air-intake passage which is upstream of the throttle device from being lowered undesirably. For example, when the throttle valve is closed during high-speed driving of the vehicle, the air taken in through the main inlet can increase the inner pressure in the portion of the air-intake passage which is upstream of the throttle device. As a result, acceleration capability at the time when the throttle valve is opened next, can be improved.

The main inlet may be disposed to receive a higher ram pressure than the sub-inlet; and the on-off valve may be at least a two-way valve configured to permit the air flowing from the sub-inlet toward the joint section and the air flowing from the joint section toward the sub-inlet.

In general, when the throttle valve is closed and an engine brake is applied, an inner pressure in a portion of the air-intake passage which is upstream of the throttle device increases. If the inner pressure increases excessively, the air flowing from a region in the vicinity of the throttle valve in an idling position corresponding to an idling engine speed toward the engine (combustion chamber) increases, and thereby the engine brake does not work effectively. In accordance with this configuration, since a ram pressure applied to the sub-inlet is lower than a ram pressure applied to the main inlet and the air is permitted to flow from the joint section toward the sub-inlet, the air taken in through the main inlet can be released through the sub-inlet when the inner pressure in the air-intake passage becomes too high. As a result, an excess increase in the inner pressure in the air-intake passage is suppressed and the engine brake works effectively.

The on-off valve may include a first counter member configured to apply a first counter force against a first operation of the valve body in which the valve body opens by a pressure of the air flowing from the sub-inlet toward the joint section; and a second counter member configured to apply a second counter force against a second operation of the valve body in which the valve body opens by a pressure of the air flowing from the joint section toward the sub-inlet, the second counter force being larger than the first counter force. In a state where the engine is in a stopped state, the valve body may be in a closed position in which the valve body inhibits air communication between the sub-inlet and the joint section.

In accordance with this configuration, since the second counter force against the second operation is larger than the first counter force against the first operation, the inner pressure in the portion of the air-intake passage which is upstream of the throttle device can be increased to a pressure which can be countered by the second counter force. When the inner pressure exceeds this pressure, the second operation of the valve body is permitted.

At least one of the first counter member and the second counter member may include an elastic member which is elastically deformed by at least one of the first operation and the second operation, and the first counter force or the second counter force applied to the valve body is a restoring force of the elastic member.

In accordance with this configuration, when the valve body performs the first operation or the second operation, the elastic member of the first counter member or the second counter member is elastically deformed, and a restoring force of the elastic member (force generated by the elastic member which is going to return from its elastically deformed state to its natural state) is applied to the valve body as the first counter force or the second counter force.

The main duct component may include an upstream duct member having the main inlet and a downstream duct member provided downstream of the upstream duct member in an air flow direction and upstream of the air cleaner in the air flow direction; and the sub-duct component is provided integrally with the downstream duct member.

A vehicle may or may not include a sub-duct component. In accordance with the above configuration, to attain either one construction, the downstream duct member provided integrally with the sub-duct component or the downstream duct member which is not provided with the sub-duct component may be suitably selected. Therefore, identical components can be used as the upstream duct member, the air cleaner, and other members, which are assembled with the downstream duct member provided integrally with the sub-duct component and the downstream duct member which is not provided with the sub-duct component. As a result, versatility can be improved.

The above object, other objects, features, and advantages of the present invention will be apparent by the following detailed description of preferred embodiment of the inventions, with reference to the accompanying drawings.

DETAILED DESCRIPTION OF THE PREFERRED EMBODIMENTS

Hereinafter, embodiments of the present invention will be described with reference to the drawings. The stated directions are referenced from the perspective of a driver straddling a vehicle (motorcycle), unless otherwise explicitly noted.

Embodiment 1

[Construction of Motorcycle]

Figure 1:
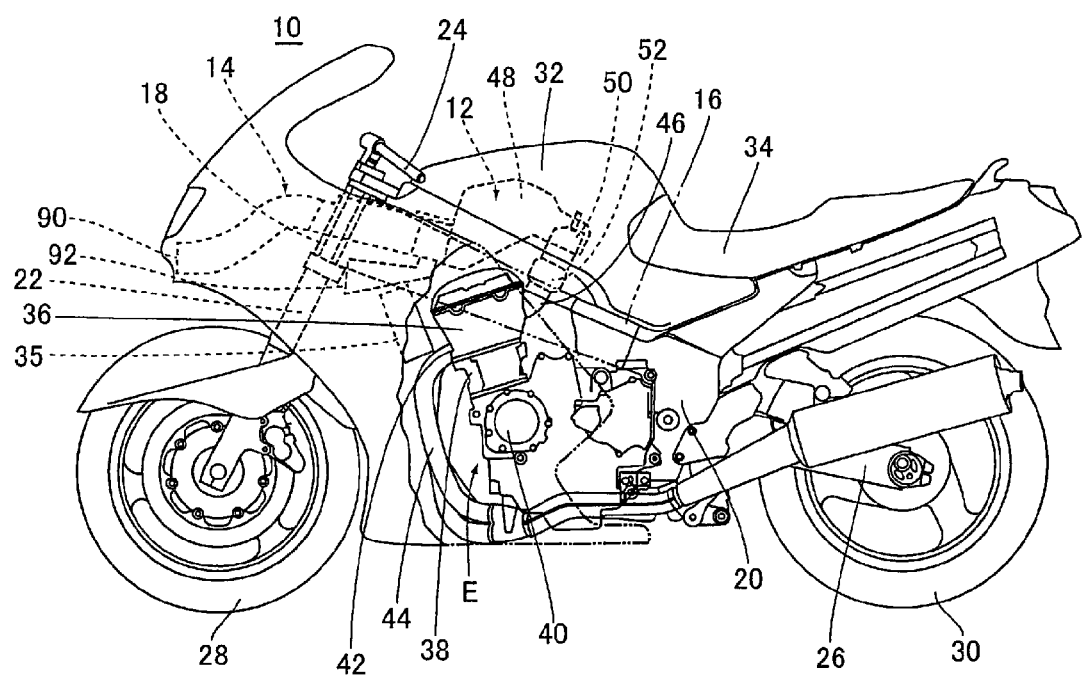
FIG. 1 is a left side view showing a construction of an entire vehicle (motorcycle) according to Embodiment 1.

FIG. 1 is a left side view of a construction of an entire motorcycle 10 which is a vehicle according to Embodiment 1

Referring now to FIG. 1, the motorcycle 10 includes a main frame member 16, a head pipe 18 provided at the front portion of the main frame member 16 and a pair of right and left pivot frame members 20 provided at the rear portion of the main frame member 16. A steering shaft (not shown) is rotatably inserted into the head pipe 18. A front fork 22 and a steering handle 24 are attached to the steering shaft. A pair of right and left swing arms 26 are attached to the pivot frame members 20, respectively. A front wheel 28 is mounted to the lower end portion of the front fork 22. A rear wheel 30 is mounted to the rear end portions of the swing arms 26. A fuel tank 32 and a seat 34 are arranged at the upper portion of the main frame member 16 such that the fuel tank 32 is disposed forward relative to the seat 34. An engine E is mounted at the center portion in a space defined by the main frame member 16 below the fuel tank 32. A radiator 35 is disposed forward relative to the engine E.

As shown in FIG. 1, the engine E includes a cylinder head 36, a cylinder block 38, and a crankcase 40. Although not shown, a combustion chamber is formed inside the cylinder head 36. A cylinder and a piston are accommodated in the cylinder block 38. A crankshaft driven to rotate by the piston is accommodated in the crankcase 40. In this embodiment, the engine E is an inline four-cycle four-cylinder reciprocating engine. The four cylinders and four combustion chambers are arranged in a rightward and leftward direction. Exhaust pipes 44 are respectively coupled to exhaust ports 42 respectively corresponding to the four combustion chambers and configured to exhaust air therethrough. An air-intake passage 12 is coupled to intake ports 46 respectively corresponding to the four combustion chambers to suction an air-fuel mixture containing air and fuel.

Figure 2:
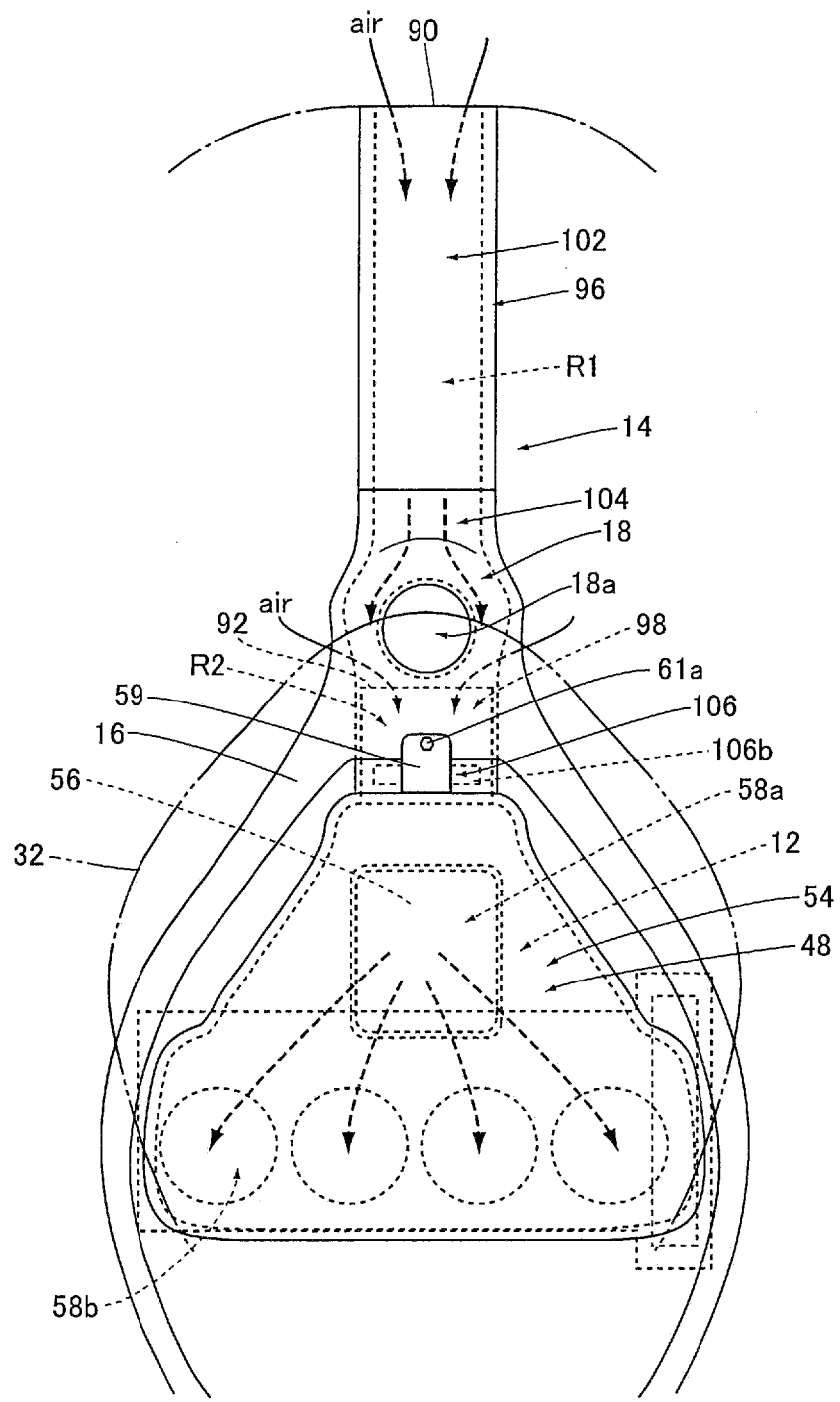
FIG. 2 is a plan view showing a configuration of an air-intake passage including a duct structure, an air cleaner and a throttle device.
Figure 3:
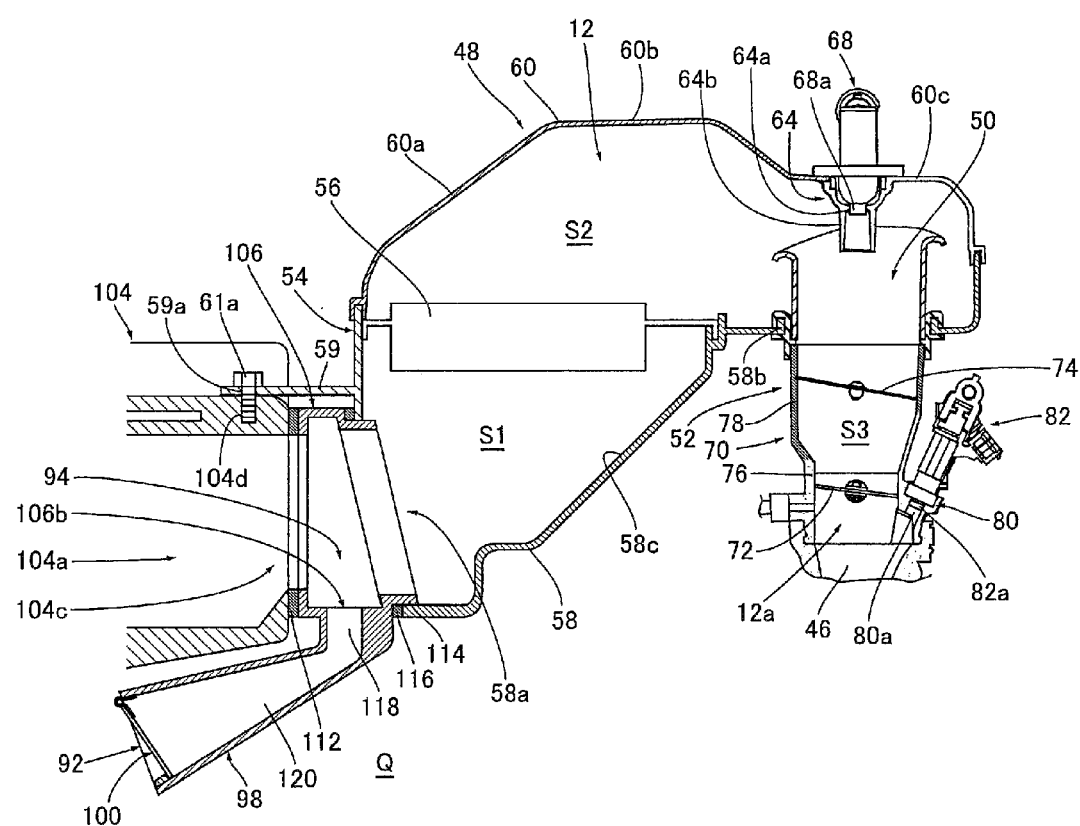
FIG. 3 is a cross-sectional view showing a configuration of the air cleaner and the throttle device.

FIG. 2 is a plan view showing a configuration of the air-intake passage 12 of the motorcycle 10. FIG. 3 is a cross-sectional view showing a configuration of the air cleaner 48 and the throttle device 52 which constitute a part of the air-intake passage 12.

As shown in FIGS. 2 and 3, the air-intake passage 12 includes a duct structure 14 configured to take in air from outside, the air cleaner 48 configured to clean the air taken in through the duct structure 14, four air-intake ducts 50 and the throttle device 52 (FIG. 3) which are coupled to each other from an upstream side in the air flow direction. A portion of the air-intake passage 12 which is located downstream of the air cleaner 48 branches to form four branch passages 12a respectively corresponding to the four combustion chambers.

[Configuration of Air Cleaner]

As shown in FIG. 3, the air cleaner 48 is configured to take in air from outside, clean the air and distribute the cleaned air to the four branch passages 12a, and includes the air cleaner box 54 constituting a part of the air-intake passage 12, and an air filter 56 for cleaning the air flowing through the inside of the air cleaner box 54.

The air cleaner box 54 includes a lower case 58 formed of synthetic resin and an upper case 60 formed of synthetic resin. The lower case 58 and the upper case 60 are joined to each other to form the air cleaner box 54 of a box shape. The air filter 56 is disposed in the vicinity of a boundary between an inner space S1 formed inside the lower case 58 and an inner space S2 formed inside the upper case 60.

An air inlet 58a is formed at the front portion of the lower case 58 to open in a forward direction. Four air outlets 58b respectively corresponding to the four branch passages 12a are formed at the rear portion of the lower case 58 such that the air outlets 58b open in a downward direction and are aligned in the rightward and leftward direction. A guide surface 58c is formed at the centre portion of the lower case 58 to smoothly guide the air taken in through the air inlet 58a to the air filter 56 and the air outlet 58b such that the guide surface 58c is tilted to increase its height in a rearward direction. A plate-shaped fastening member 59 is provided at the outer surface of the front portion of the lower case 58 in a location above the air inlet 58a to fasten the air cleaner box 54 to the head pipe 18 such that the fastening member 59 protrudes forward. The fastening member 59 has a hole 59a into which a fastener screw 61a is inserted.

A portion (front portion) 60a of the upper case 60 which is opposite to the air filter 56 is tilted such that its inner surface increases in height toward a center portion 60b. A portion (rear portion) 60c of the upper case 60 which is opposite to the air outlets 58b is formed such that its inner surface is lower than the inner surface of the center portion 60b. Such a structure allows the air cleaned by the air filter 56 to be guided smoothly to the four respective air outlets 58b along the inner surface of the upper case 60. Recesses 64 having through-holes 64a are formed at the rear portion 60c of the upper case 60. Tubular fuel guides 64b are formed at the peripheral portions of the through-holes 64a, respectively such that the fuel guides 64b protrude into the inner space S2 of the air cleaner box 54.

The air-intake ducts 50 having funnel-shaped upper end portions are attached to the four air outlets 58b, respectively. The tip end portions of upstream injectors 68 are accommodated into the recesses 64, respectively. The upstream injectors 68 are configured to inject the fuel into the air-intake passage 12 in the inner space S2 of the air cleaner box 54. Injection ports 68a formed at the tip end portions of the upstream injectors 68 are fitted to the through-holes 64a of the recesses 64, respectively. The injection ports 68a communicate with the air-intake passage 12 (inner space S2) through the fuel guides 64b, respectively. Therefore, in the air-intake passage 12 (inner space S2), the air cleaned by the air filter 56 is mixed with the fuel injected through the injection ports 68a, and the resulting air-fuel mixture is supplied to the four branch passages 12a through the four air outlets 58b, respectively.

The inner space S1 of the lower case 58 is a part of a main passage R1 (FIG. 4) for guiding air toward the air filter 56. The lower case 58 is a part of the duct structure 14.

[Configuration of Throttle Device]

As shown in FIG. 3, the throttle device 52 is configured to control the amount of air and fuel which are supplied to the combustion chambers (not shown), and includes throttle bodies 70 constituting a part of the air-intake passage 12, downstream throttle valves 72 for controlling the flow rate of the air and the fuel, inside the throttle bodies 70, and upstream throttle valves 74 for controlling the flow rate and the fuel, inside the throttle bodies 70.

The throttle bodies 70 are tubular members configured to guide to the combustion chambers, the air and fuel which are supplied from the air cleaner 48 to the throttle bodies 70 through the air-intake ducts 50, respectively. In this embodiment, four throttle bodies 70 are aligned in the rightward and leftward direction. Each throttle body 70 includes a downstream tubular portion 76 coupled to the intake port 46 and an upstream tubular portion 78 coupled to the associated air-intake duct 50. The upstream tubular portion 78 has a larger inner diameter than the downstream tubular portion 76. The downstream tubular portion 76 is provided on its outer surface with a recess 80 having a through-hole 80a. The downstream throttle valve 72 is provided inside the downstream tubular portion 76. The upstream throttle valve 74 is provided inside the upstream tubular portion 78. The tip end portion of the downstream injector 82 is accommodated into the recess 80.

The downstream throttle valve 72 is a main throttle valve configured to be directly operated by the driver. An accelerator grip (not shown) is coupled to the downstream throttle valve 72 via a throttle wire (not shown). According to the driver's operation amount of the accelerator grip, the opening degree of the downstream throttle valve 72 is controlled. In contrast, the upstream throttle valve 74 is a sub-throttle valve actuated in an auxiliary manner by a control unit (ECU) or the like. A drive motor (not shown) is coupled to the upstream throttle valve 74. The control unit (ECU) drives the drive motor to move the upstream throttle valve 74, thereby controlling the opening degree of the upstream throttle valve 74. Therefore, even when the driver operates the accelerator grip rapidly to change the opening degree of the downstream throttle valve 72 rapidly, the upstream throttle valve 74 operates to change the flow rate of the air smoothly, thereby enabling the engine speed of the engine E to change smoothly. When the motorcycle 10 is accelerated at an exit of a corner, the downstream throttle valve 72 and the upstream throttle valve 74 are opened to a great degree, while an engine brake is applied by the driver, at least the downstream throttle valve 72 is fully closed. Even in a state where the downstream throttle valve 72 is in a fully closed position (has an idling opening degree corresponding to an idling engine speed), there is a slight clearance between the outer peripheral surface of the downstream throttle valve 72 and the inner peripheral surface of the throttle body 70. Therefore, if an inner pressure in a portion of the air-intake passage 12 which is located upstream of the throttle device 52 increases excessively, the air containing the fuel, which flows to the engine E (combustion chamber) through the clearance might increase undesirably.

The downstream injector 82 is configured to inject the fuel to the air-intake passage 12 in an inner space S3 of the throttle body 70. An injection port 82*a* formed at the tip end portion of the downstream injector 82 is fitted to the through-hole 80*a* of the recess 80 and communicates with the air-intake passage 12 (inner space S3). Therefore, in each branch passage 12*a* (inner space S3) of the air-intake passage 12, the air and fuel delivered from the air cleaner 48 through the air-intake duct 50 is mixed with the fuel injected through the injection port 82*a*, and the resulting air-fuel mixture is supplied to the combustion chamber through the intake port 46. The fuel injection amount of the upstream injector 68 and the fuel injection amount of the downstream injector 82 are controlled according to a load state of the engine E. For example, in a state where the engine E is under a low-load state, i.e., running at a low engine speed, only the downstream injector 82 injects the fuel, while in a state where the engine E is under a high-load state, i.e., running at a high engine speed, both the upstream injector 68 and the downstream injector 82 inject the fuel.

[Configuration of Duct Structure]

Figure 4:
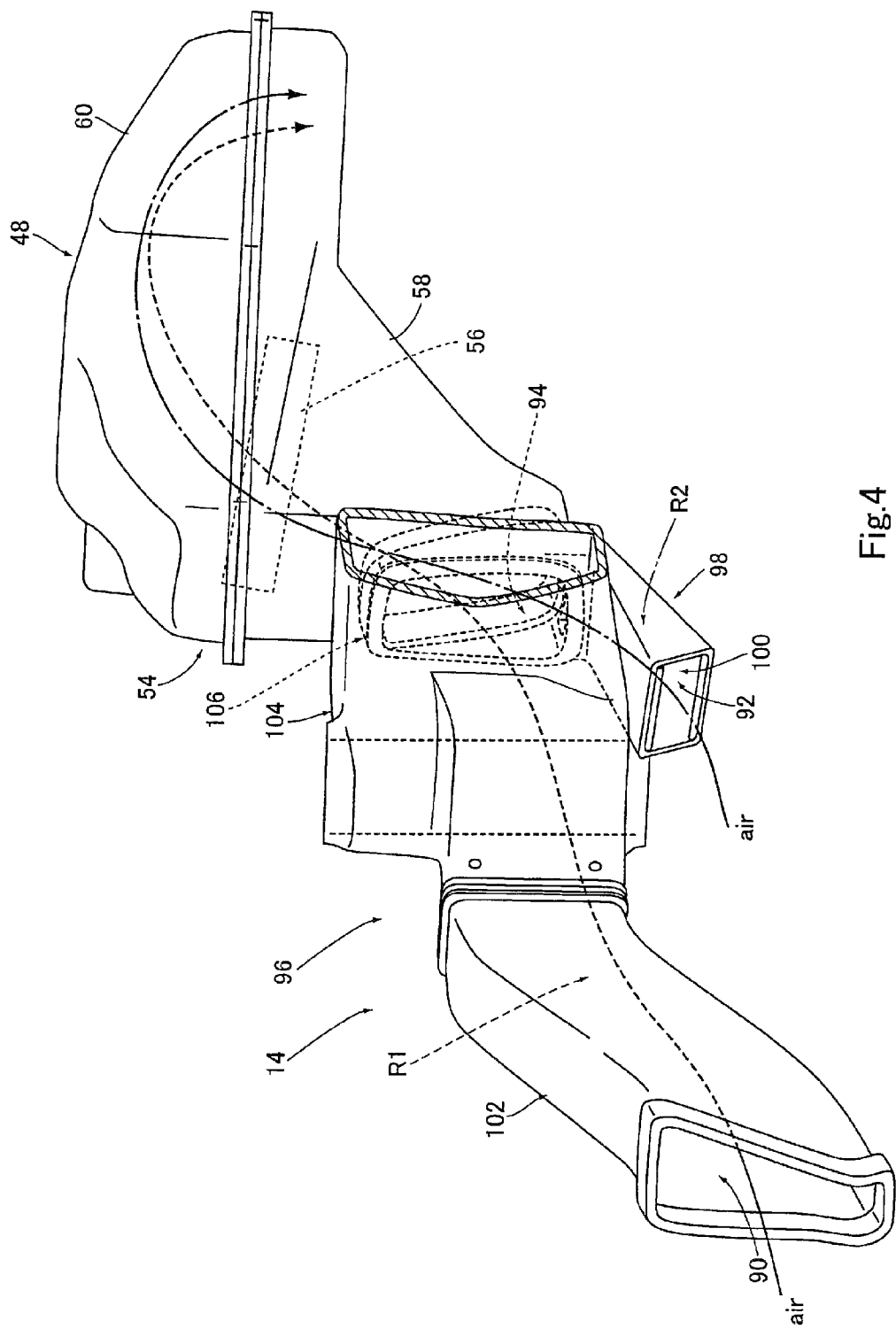
FIG. 4 is a perspective view showing a configuration of the duct structure.
Figure 5:
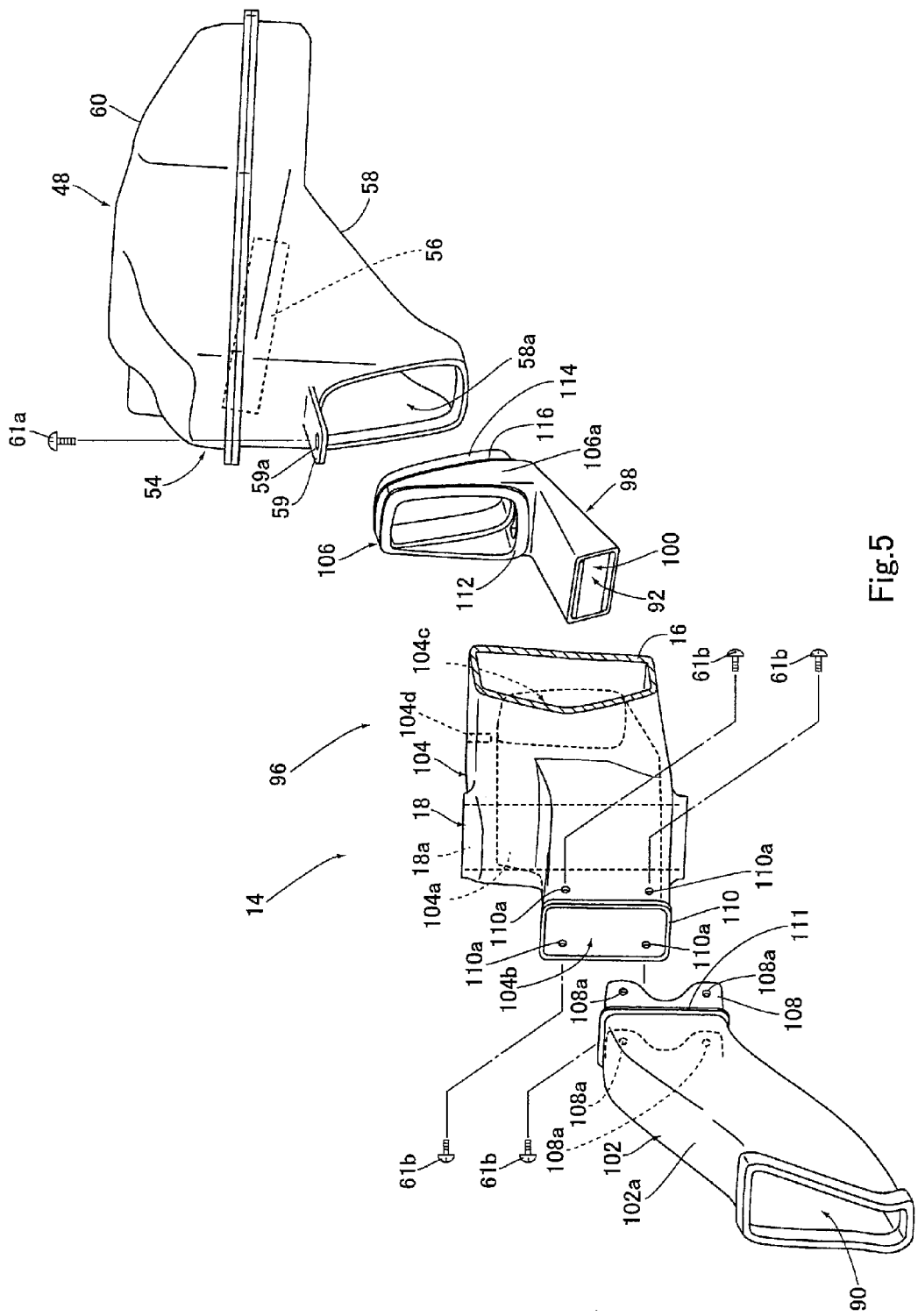
FIG. 5 is an exploded perspective view showing a configuration of the duct structure.
Figure 6:
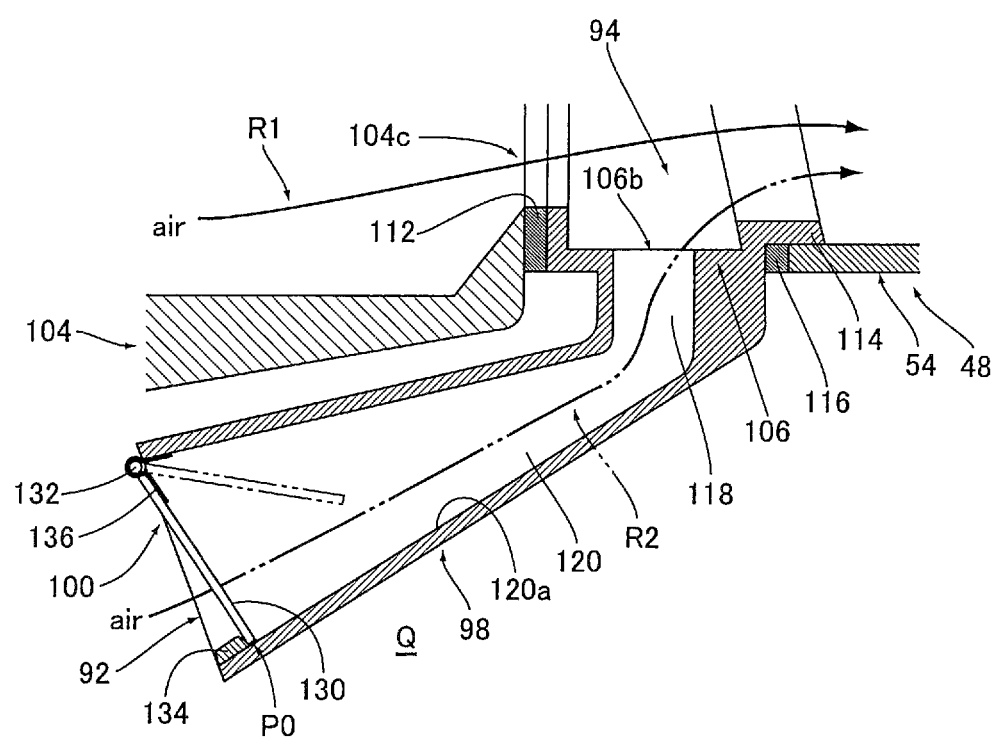
FIG. 6 is a cross-sectional view showing a configuration of a sub-duct component and an on-off valve which constitute a part of the duct structure.

FIG. 4 is a perspective view showing a configuration of the duct structure 14. FIG. 5 is an exploded perspective view showing a configuration of the duct structure 14. FIG. 6 is a cross-sectional view showing a configuration of a sub-duct component 98 and an on-off valve 100 which constitute a part of the duct structure 14.

Referring to FIG. 4, the duct structure 14 is configured to take in air to be supplied to the air cleaner 48 from outside, and includes a main inlet 90 configured to take in air therethrough from outside by utilizing a ram pressure, a main passage R1 extending from the main inlet 90 to the air filter 56, a sub-inlet 92 configured to take in air therethrough from outside, a joint section 94 where the air delivered through the sub-inlet 92 is joined to the air in the main passage R1 in a location upstream of the air filter 56, and a sub-passage R2 extending from the sub-inlet 92 to the joint section 94. That is, in addition to the main passage R1 extending from the main inlet 90 to the air filter 56, the duct structure 14 includes the sub-passage R2 which branches from the main passage R1.

The duct structure 14 is configured to take in air into the air-intake passage 12 through both the main inlet 90 and the sub-inlet 92.

To be more specific, the duct structure 14 includes a main duct component 96 which is coupled to the air cleaner 48 and constitutes at least a portion of the main passage R1, a sub-duct component 98 which is provided at the main duct component 96 or the air cleaner 48 (in this embodiment, main duct component 96) and constitutes the sub-passage R2 extending from the sub-inlet 92 to the joint section 94, and the on-off valve 100. Since the inner space S1 of the lower case 58 in the air cleaner box 54 forms a portion of the main passage R1, the lower case 58 is included in the duct structure 14 conceptually.

Referring to FIG. 5, the main duct component 96 is a tubular component extending from the air inlet 58*a* of the air cleaner box 54 to the front end portion of the motorcycle 10, and includes an upstream duct member 102 having the main inlet 90, a head duct member 104 provided integrally with the head pipe 18, and a downstream duct member 106 provided downstream of the upstream duct member 102 and the head pipe 18 and upstream of the air cleaner 48.

The upstream duct member 102 has a tubular duct body 102*a* provided with the main inlet 90 at one end portion (i.e., front end portion). The duct body 102*a* has a spigot 108 at an opposite end portion (rear end portion) thereof. The spigot 108 has at least one (in this embodiment, four) hole 108*a* into which a fastener screw 61*b* is inserted. An annular seal material 111 is attached to the outer periphery of a base end portion of the spigot 108 and is configured to contact the tip end surface of a receiver 110 as described later.

The head duct member 104 includes an air passage 104*a* formed around a hole 18*a* of the head pipe 18, an air inlet 104*b* formed at the side surface of the front portion of the head pipe 18, and an air outlet 104*c* formed at the side surface of the rear portion of the head pipe 18. The air inlet 104*b* is provided with a receiver 110 into which the spigot 108 of the upstream duct member 102 is insertable. The receiver 110 has at least one (in this embodiment, four) screw hole 110*a* with which the fastener screw 61*b* inserted into the hole 108*a* of the spigot 108 is threadingly engageable. The head duct member 104 has a screw hole 104*d* on an upper surface of a portion located behind the hole 18*a* of the head pipe 18. The fastener screw 61*a* inserted into the hole 59*a* of the air cleaner box 54 is threadingly engageable into the screw hole 104*d*. The main frame member 16 is formed integrally with the head pipe 18. In FIGS. 4 and 5, the cross-section (portion hatched in these Figures) of the main frame member 16 appears behind the head duct member 104.

As shown in FIGS. 3 and 5, the downstream duct member 106 includes a tubular duct body 106*a* of a substantially trapezoidal shape when viewed from the side. An annular seal material 112 is attached to one end portion (front end portion) of the duct body 106*a* and configured to contact the air outlet 104*c* of the head duct member 106. A spigot 114 is formed at the opposite end portion (rear end portion) of the duct body 106*a* and configured to be inserted into the air inlet 58*a* of the air cleaner box 54. An annular seal material 116 is attached to the outer periphery of the base end portion of the spigot 114 and configured to contact the inner peripheral edge of the air inlet 58*a*. As shown in FIG. 3, an opening portion 106*b* is formed at the bottom portion of the downstream duct member 106. The sub-duct component 98 is provided to communicate with the opening 106*b*.

In the duct structure 14, the spigot 108 of the upstream duct member 102 is inserted into the receiver 110 of the head duct member 104. The spigot 108 is coupled to the receiver 110 by the fastener screws 61*b*. The spigot 114 of the downstream duct member 106 is inserted into the air inlet 58*a* of the air cleaner box 54, the seal material 112 attached to the front end portion of the downstream duct member 106 is in contact with the air outlet 104*c* of the head duct member 104, and the air cleaner box 54 is fastened to the head pipe 18 by the fastener screw 61*a* so as to maintain the fastened state. That is, the downstream duct member 106 does not have special arrangement for fastening the downstream duct member 106 but is securely fastened between the air cleaner box 54 and the head pipe 18 such that the downstream duct member 106 is sandwiched between the air cleaner box 54 and the head pipe 18.

FIG. 6 is a cross-sectional view showing a configuration of the sub-duct component 98 and a configuration of the on-off valve 100. Referring to FIG. 6, the sub-duct component 98 is a tubular component forming the sub-passage R2 having a substantially rectangular cross-section and is provided integrally with the downstream duct member 106. The sub-duct component 98 includes a tubular first portion 118 extending downward from the bottom portion of the downstream duct member 106 and a tubular second portion 120 extending forward from the lower end portion of the first portion 118 and provided with the sub-inlet 92 at a front end portion thereof. The second portion 120 serves to take in air from a region Q located behind the head pipe 18 and above the radiator 35. In this embodiment, the second portion 120 funnels to have a passage cross-sectional area gradually increasing in the forward direction to efficiently suction air. The second portion 120 has a bottom surface 120*a* which is tilted to be lower in the forward direction so that rain water and the like entering through the sub-inlet 92 are discharged naturally. Inside the sub-duct component 98, the on-off valve 100 is provided. The on-off valve 100 is configured to open and close to permit and inhibit air communication between the sub-inlet 92 and the joint section 94 (i.e., sub-passage R2).

In this embodiment, the main inlet 90 of the main duct component 96 is disposed at the front end portion of the motorcycle 10, while the sub-inlet 92 of the sub-duct component 98 is disposed in the region Q. Therefore, the length of a passage extending from the sub-inlet 92 to the air filter 56 through the joint section 94, i.e., passage including the sub-passage R2, is shorter than the length of the main passage R1. The main inlet 90 disposed at the front end portion of the motorcycle 10 receives a higher ram pressure than the sub-inlet 92 disposed in the region Q.

[Configuration of On-Off Valve]

Referring to FIG. 6, the on-off valve 100 includes a valve body 130 positioned to permit and inhibit the air flow through the sub-duct component 98. In this embodiment, the valve body 130 is provided at the front end portion of the second portion 120 to be located in the vicinity of the sub-inlet 92. The on-off valve 100 is configured to automatically open by an air pressure directly applied to the valve body 130 during running of the engine E. In this embodiment, the on-off valve 100 is a one-way valve for permitting only air flow from the sub-inlet 92 toward the joint section 94, and has a structure as described below.

As shown in FIG. 6, the on-off valve 100 includes the plate-like valve body 130 having substantially the same shape as that of a passage cross-section of the sub-passage R2 in a closed position P0 in which the valve body 130 closes the sub-passage R2, a support portion 132 provided at the sub-duct component 98 to support an upper edge portion of the valve body 130 such that the valve body 130 is rotatable around the support portion 132, a stopper member 134 provided at the sub-duct component 98 and configured to inhibit the valve body 130 from being opened (this operation is hereinafter referred to as a second operation) by the pressure of the air flowing from the joint section 94 toward the sub-inlet 92, and a spring 136 (first counter member) which is provided at the sub-duct component 98 and configured to apply a first counter force F1 to the valve body 130 against an opening operation (hereinafter referred to as a first operation) of the valve body 130 which is caused by the pressure of the air flowing from the sub-inlet 92 toward the joint section 94. In this configuration, the on-off valve 100 is opened and the air can be taken in through the sub-inlet 92 when a negative pressure greater than the first counter force F1 is generated in the air-intake passage 12. In other cases, the valve body 130 is biased by the spring 136 so as to be pressed against the stopper member 134, and therefore, the air is not released from the air-intake passage 12 to outside through the sub-inlet 92.

Although the spring 136 is used as the first counter member in this embodiment, an elastic member such as rubber may alternatively be used. In a case where the valve body 130 can come into contact with the stopper member 134 by the weight of the valve body 130, the elastic member such as the spring or the rubber may be omitted. In that case, the weight of the valve body 130 serves as the first counter member.

In this embodiment, the valve body 130 is opened such that the valve body 130 moves from the closed position P0 toward the joint section 94, or toward the sub-inlet 92. Depending on the kind of the on-off valve used, the on-off valve may be opened in other methods. The same applies in embodiments described below.

[Operation of Motorcycle]

In a state where the engine E of the motorcycle 10 is in a stopped state, the valve body 130 of the on-off valve 100 is in the closed position P0 to inhibit air communication between the sub-inlet 92 and the joint section 94. Therefore, the sub-passage R2 is fully closed by the valve body 130 to prevent rain water and the like entering the sub-passage R2.

Upon the engine E starting to run, a negative pressure is generated in the air-intake passage 12. The spring 136 is elastically deformed by the first operation of the valve body 130, and the on-off valve 100 is opened, thereby allowing the air to be taken into the sub-duct component 98 through the sub-inlet 92. In addition, the motorcycle 10 starts driving and the ram pressure is applied to the main inlet 90. By utilizing the ram pressure, the air is taken into the main duct component 96 through the main inlet 90. In this way, during driving of the motorcycle 10, the air can be taken in through both the main inlet 90 and the sub-inlet 92 efficiently.

When the motorcycle 10 is exiting a corner at a low speed, the ram pressure applied to the main inlet 90 is low. However, the air can be taken in through the main inlet 90 and the sub-inlet 92. In particular, the air can be taken in quickly through the passage with a smaller length (low passage resistance) through the sub-inlet 92. Therefore, even during low-speed driving, a sufficient air-intake amount required for the engine E can be obtained quickly.

When the throttle valves 72 and 74 are closed during high-speed driving, an inner pressure in a portion of the air-intake passage 12 which is upstream of the throttle device 52 increases due to the air taken in through the main inlet 90. The on-off valve 100 can prevent the inner pressure from being released through the sub-inlet 92. Therefore, acceleration capability at the time when the throttle valves 72 and 74 are opened next, can be improved.

Since the valve body 130 of the on-off valve 100 is configured to open by the air pressure directly applied to the valve body 130 during running of the engine E, a driving mechanism and a driving source for opening and closing the valve body 130 are not necessary, and as a result, the number of components can be reduced.

In this embodiment, furthermore, the sub-duct component 98 is provided integrally with the downstream duct member 106. Therefore, in design change, versatility of other components and members can be improved by suitably selecting the downstream duct member 106 provided with the sub-duct component 98 or a downstream duct member (not shown) which is not provided with the sub-duct component 98.

Embodiment 2, 3

Figure 7A:
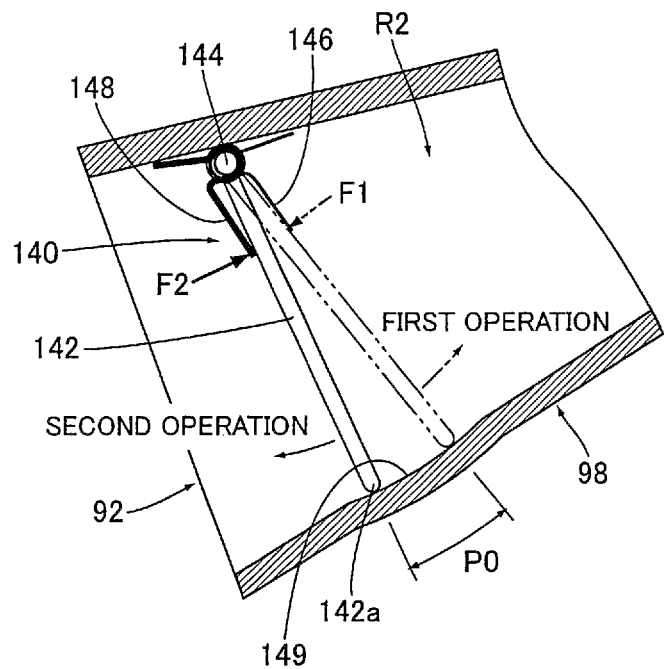
FIG. 7A is a cross-sectional view showing a configuration of an on-off valve in a vehicle (motorcycle) according to Embodiment 2.
Figure 7B:
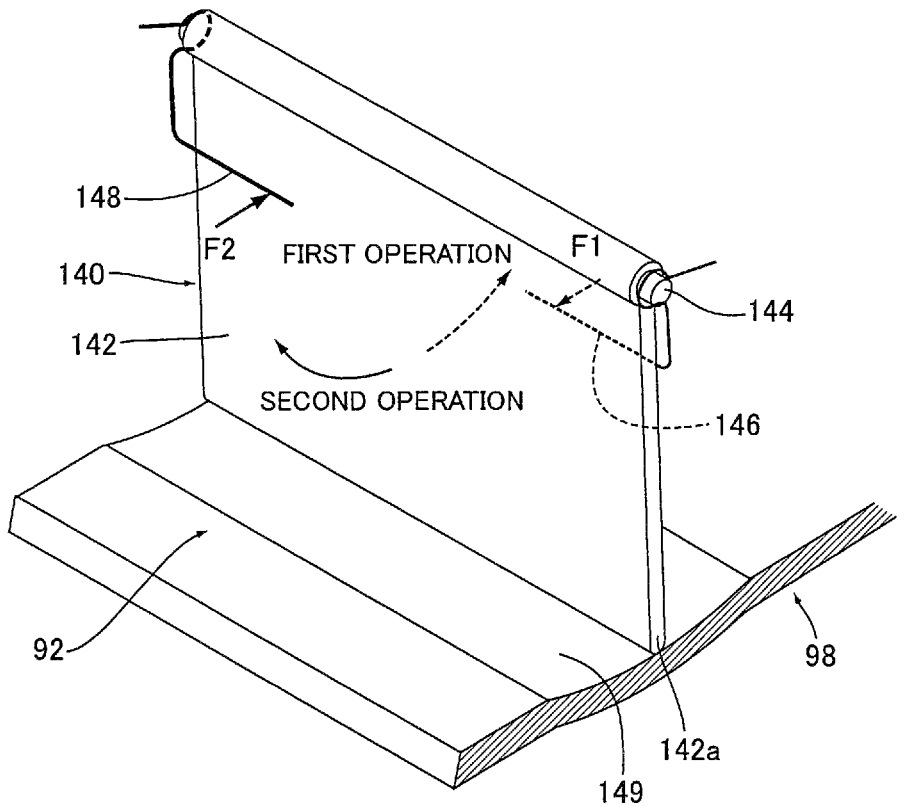
FIG. 7B is a perspective view showing a configuration of the on-off valve in the vehicle (motorcycle) according to Embodiment 2.

FIG. 7A is a cross-sectional view showing a configuration of an on-off valve 140 of the motorcycle according to Embodiment 2. FIG. 7B is a perspective view showing a configuration of the on-off valve 140 of the motorcycle according to Embodiment 2. Although the on-off valve 100 configured to permit and inhibit the air flow through the sub-passage R2 is a one-way valve for permitting only the air flow from the sub-inlet 92 toward the joint section 94, in Embodiment 1, the on-off valve 140 in Embodiment 2 is a two-way valve for permitting air flow from the joint section 94 toward the sub-inlet 92 as well as the air flow from the sub-inlet 92 toward the joint section 94.

Referring to FIG. 7, the on-off valve 140 includes a plate-like valve body 142 having substantially the same shape as that of a passage cross-section of the sub-passage R2 in a closed position P0 in which the valve body 142 closes the sub-passage R2, a support portion 144 provided at the sub-duct component 98 to support an upper edge portion of the valve body 142 such that the valve body 142 is rotatable around the support portion 144, a first spring 146 (first counter member) which is provided at the sub-duct component 98 and configured to apply a first counter force F1 against the operation (first operation) of the valve body 142 which is caused to move from the closed position P0 toward the joint section 94 (FIGS. 3 and 4), by the pressure of the air flowing from the sub-inlet 92 toward the joint section 94, and a second spring 148 (second counter member) configured to apply a second counter force F2 larger than the first counter force F1 against the operation (second operation) of the valve body 142 which is caused to move from the closed position P0 toward the sub-inlet 92 by the pressure of the air flowing from the joint section 94 toward the sub-inlet 92. The first and second springs 146 and 148 are configured not to apply biasing forces to the valve body 142 in the closed position P0 with a specified allowance. When the valve body 142 is going to move beyond the closed position P0, it presses against one of the first and second springs 146 and 148, which is thereby elastically deformed and applies a restoring force (first counter force F1 or second counter force F2). In other words, in the state where the valve body 142 is in the closed position P0, the first and second springs 146 and 148 are in a natural state where they are not elastically deformed.

The allowance of the closed position P0 is generated because of manufacturing or assembling tolerances of the first and second springs 146 and 148. It is difficult to completely eliminate this allowance. As a solution to this, in Embodiment 2, a seat surface 149 of a circular-arc shape which is opposite to an end edge 142a of the valve body 142 is formed on the inner surface of the bottom portion of the sub-duct component 98 to maintain a distance between the end edge 142a of the valve body 142 and the seat surface 149. In this way, performance of the on-off valve 140 is stabilized.

Since the second counter force F2 against the second operation is larger than the first counter force F1 against the first operation, the inner pressure in the portion of the air-intake passage 12 which is upstream of the throttle device 52 can be increased to a pressure which can be countered by the second counter force F2. When the inner pressure exceeds this pressure, the second operation of the valve body 142 is permitted so that the inner pressure is released through the sub-inlet 92. Therefore, when the throttle valves 72 and 74 are closed and an engine brake is applied, during high-speed driving, it is possible to prevent the inner pressure in the portion of the air-intake passage 12 which is upstream of the throttle device 52 from becoming too high. As a result, it is possible to lessen an amount of the air-fuel mixture flowing from a region in the vicinity of the throttle valves 72 and 74 in an idling position corresponding to an idling engine speed toward the engine E (combustion chamber), and thus the engine brake works effectively.

Alternatively, one or both of the first spring 146 (first counter member) and the second spring 148 (second counter member) may be replaced by an elastic member such as rubber. In another alternative, one of the first counter member and the second counter member may be omitted when the valve body 142 can be closed by utilizing the weight of the valve body 142.

The on-off valve 140 may be configured as at least the two-way valve for permitting the air flow in at least two directions so long as the above mentioned advantage of Embodiment 2 is achieved. For example, the on-off valve 140 may be configured as a three-way valve for additionally permitting air flow in another direction.

Figure 8:
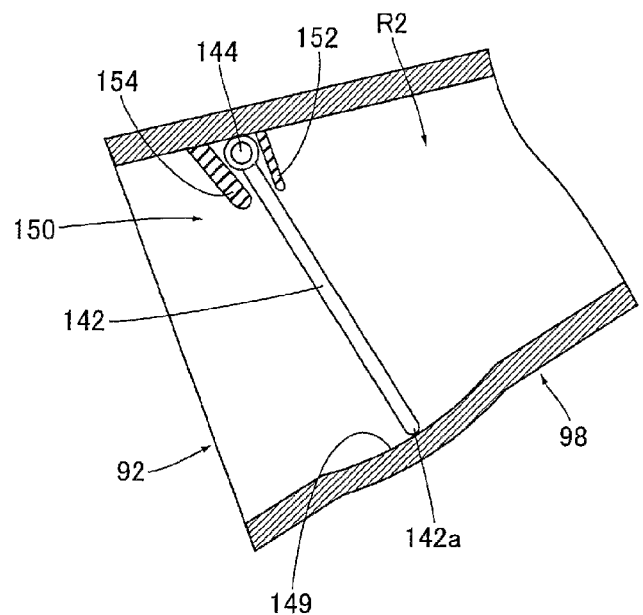
FIG. 8 is a cross-sectional view showing a configuration of an on-off valve in a vehicle (motorcycle) according to Embodiment 3.

FIG. 8 shows an on-off valve 150 according to Embodiment 3, including elastic counter members 152, and 154 made of rubber as the first and second counter members, respectively. The other constituents of the on-off valve 150 are identical in structure to those of the on-off valve 140 (FIG. 7).

Embodiment 4, 5

Figure 9:
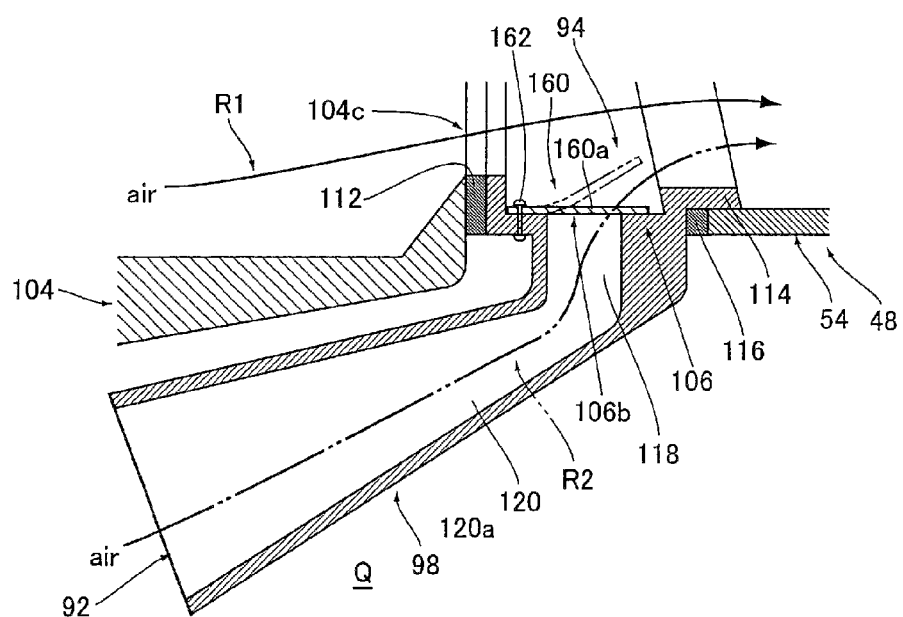
FIG. 9 is a cross-sectional view showing a configuration of an on-off valve in a vehicle (motorcycle) according to Embodiment 4.
Figure 10:
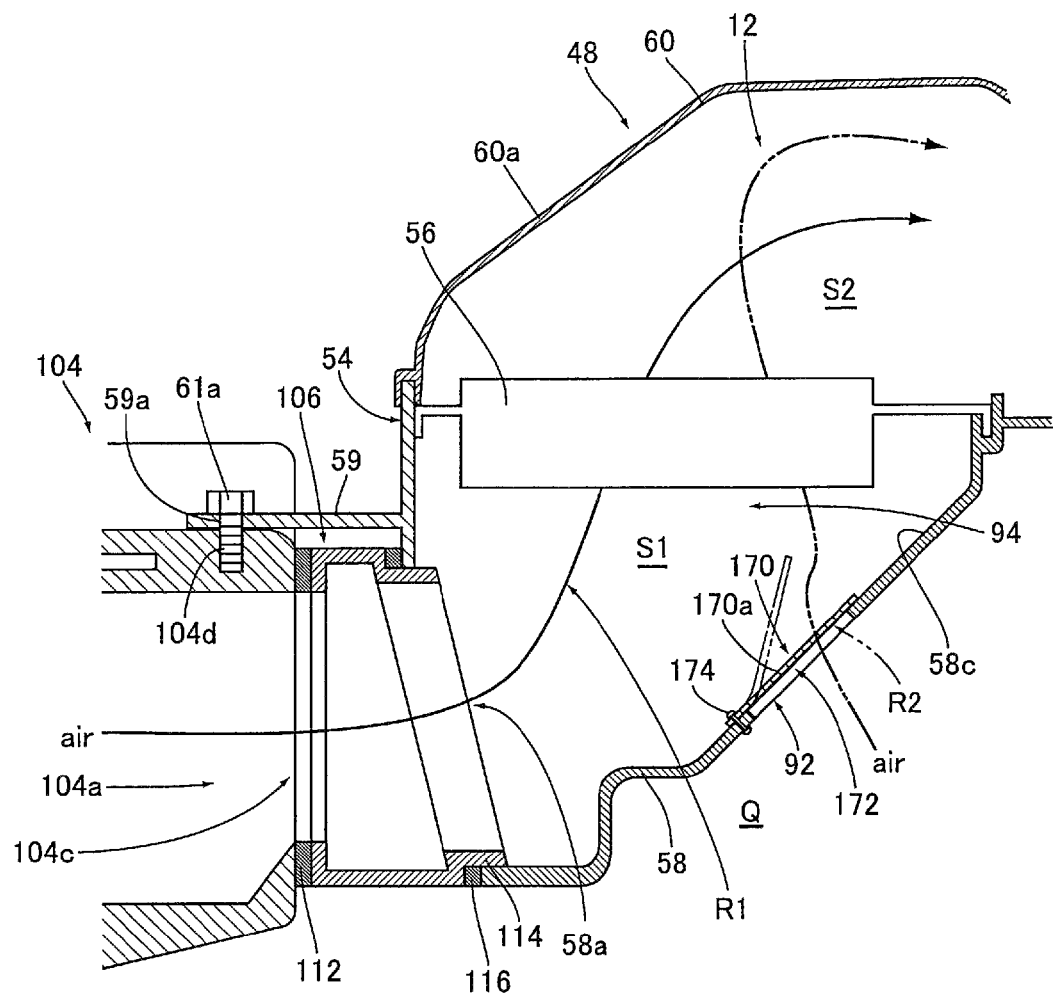
FIG. 10 is a cross-sectional view showing a configuration of an on-off valve in a vehicle (motorcycle) according to Embodiment 5.

FIG. 9 is a cross-sectional view showing a configuration of an on-off valve 160 in a motorcycle according to Embodiment 4. FIG. 10 is a cross-sectional view showing a configuration of an on-off valve 170 in a motorcycle according to Embodiment 5.

Although the on-off valves 100, 140 and 150 are provided at the front end portion of the second portion 120 in the vicinity of the sub-inlet 92 as shown in FIGS. 6, 7, and 8, an on-off valve may be positioned to permit and inhibit the air flow through the sub-duct component 98, regardless of whether the on-off valve is a one-way valve or a two-way valve. For example, as shown in FIG. 9, in Embodiment 4, the on-off valve 160 may be provided to open and close an opening 106b formed on the inner surface of the bottom portion of the downstream duct member 106. Or, as shown in FIG. 10, in Embodiment 5, a hole-shaped sub-duct portion 172 may be formed in the lower case 58 (guide surface 58c in Embodiment 5) of the air cleaner box 54 and an on-off valve 170 may be provided on the inner surface of the lower case 58 to open and close the sub-duct portion 172. The on-off valve 160 includes a plate-shaped valve body 160a having an end portion fastened to the inner surface of the downstream duct member 106 by a fastener member 162 such as a rivet. Likewise, the on-off valve 170 includes a plate-shaped valve body 170a having an end portion fastened to the inner surface of the lower case 58 by a fastener member 174 such as a rivet. The on-off valves 160 and 170 are one-way valves configured to permit the air flow taken in through the sub-inlet 92 but inhibit the air flow in an opposite direction.

As should be readily appreciated from the foregoing, the vehicle of the present invention is capable of obtaining a sufficient air-intake amount required for the engine quickly, even during low-speed driving when a ram pressure is low, and is widely applicable to motorcycles and personal watercraft (PWC) which can achieve this advantage.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An air-intake structure of an engine comprising:
  a duct structure configured to take in air from outside;
  an air cleaner including an air filter configured to clean the air guided to the air cleaner through the duct structure;
  a throttle device including a throttle valve for controlling a flow rate of the air guided to the throttle device through the air cleaner;
  an engine including an intake port configured to suction the air guided to the engine through the throttle device; and
  an on-off valve provided in the duct structure;
  the duct structure including:
    a main inlet configured to take in air therethrough from outside by utilizing a ram pressure;
    a main passage extending from the main inlet to the air filter;
    a sub-inlet configured to take in air therethrough from outside; and
    a joint section located upstream of the air filter, the air flowing from the sub-inlet being joined to the air in the main passage, at the joint section;
  wherein the on-off valve is configured to permit and inhibit air communication between the sub-inlet and the joint section;
  wherein the on-off valve includes a valve body positioned to permit and inhibit air flow through the sub-inlet of the duct structure; and
  wherein the valve body is configured to open by an air pressure directly applied to the valve body during running of the engine.

2. The air-intake structure of the engine according to claim 1, wherein the on-off valve is a one-way valve configured to permit only air flowing from the sub-inlet toward the joint section.

3. The air-intake structure of the engine according to claim 1,
  wherein the main inlet is disposed to receive a higher ram pressure than the sub-inlet; and
  wherein the on-off valve is at least a two-way valve configured to permit the air flowing from the sub-inlet toward the joint section and the air flowing from the joint section toward the sub-inlet.

4. The air-intake structure of the engine according to claim 3,
  wherein the on-off valve includes a first counter member configured to apply a first counter force against a first operation of the valve body in which the valve body opens by a pressure of the air flowing from the sub-inlet toward the joint section; and a second counter member configured to apply a second counter force against a second operation of the valve body in which the valve body opens by a pressure of the air flowing from the joint section toward the sub-inlet, the second counter force being larger than the first counter force; and
  wherein in a state where the engine is in a stopped state, the valve body is in a closed position in which the valve body inhibits air communication between the sub-inlet and the joint section.

5. The air-intake structure of the engine according to claim 4, wherein at least one of the first counter member and the second counter member includes an elastic member which is elastically deformed by at least one of the first operation and the second operation, and the first counter force or the second counter force applied to the valve body is a restoring force of the elastic member.

6. The air-intake structure of the engine according to claim 1,
  wherein the duct structure includes a main duct component constituting at least a portion of the main passage and a sub-duct component constituting a sub-passage extending from the sub-inlet to the joint section;
  wherein the main duct component includes an upstream duct member having the main inlet and a downstream duct member provided downstream of the upstream duct member in an air flow direction and upstream of the air cleaner in the air flow direction; and
  wherein the sub-duct component is provided integrally with the downstream duct member.

7. The air-intake structure of the engine according to claim 1, wherein a passage extending from the sub-inlet to the air filter through the joint section has a length smaller than a length of the main passage.

8. An air-intake structure of an engine comprising:
  a duct structure configured to take in air from outside;
  an air cleaner including an air filter configured to clean the air guided to the air cleaner through the duct structure;
  a throttle device including a throttle valve for controlling a flow rate of the air guided to the throttle device through the air cleaner; and
  an engine including an intake port configured to suction the air guided to the engine through the throttle device;
  the duct structure including:
    a main inlet configured to take in air therethrough from outside by utilizing a ram pressure;
    a main passage extending from the main inlet to the air filter;
    a sub-inlet configured to take in air therethrough from outside; and
    a joint section located upstream of the air filter, the air flowing from the sub-inlet being joined to the air in the main passage, at the joint section;
  wherein the main inlet is disposed to be applied with a higher ram pressure than the sub-inlet; and
  wherein a passage extending from the sub-inlet to the air filter through the joint section has a length smaller than a length of the main passage.

9. The air-intake structure of the engine according to claim 8,
  wherein the sub-inlet is configured to take in the air from forward in a driving direction of a vehicle including the air-intake structure.

10. The air-intake structure of the engine according to claim 9,
  wherein the sub-inlet is disposed in a space above a radiator.

11. The air-intake structure of the engine according to claim 9,
  wherein the air-intake structure is used in a motorcycle;

wherein the main inlet is disposed at a front end portion of the motorcycle; and wherein the sub-inlet is disposed behind a head pipe of the motorcycle.

12. The air-intake structure of the engine according to claim 8, wherein the sub-inlet is disposed below the main passage.

13. The air-intake structure of the engine according to claim 8, wherein a passage resistance in a passage extending from the sub-inlet to the air filter through the joint section is smaller than a passage resistance in the main passage.

\* \* \* \* \*